United States Patent
Keyes et al.

(10) Patent No.: US 12,398,519 B2
(45) Date of Patent: Aug. 26, 2025

(54) CONTROLLED STOPPING FOR A COMPACTOR MACHINE

(71) Applicant: Caterpillar Paving Products Inc., Brooklyn Park, MN (US)

(72) Inventors: Joshua D. Keyes, Saint Michael, MN (US); Matthew Thomas Hanson, St. Louis Park, MN (US); Nathaniel Doy, Maple Grove, MN (US); Nicholas Aaron Greene, Elk River, MN (US); Paul Russell Friend, Morton, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 272 days.

(21) Appl. No.: 18/331,642

(22) Filed: Jun. 8, 2023

(65) Prior Publication Data

US 2024/0410118 A1    Dec. 12, 2024

(51) Int. Cl.
| | | |
|---|---|---|
| *E01C 19/00* | (2006.01) | |
| *B60T 7/12* | (2006.01) | |
| *E01C 19/26* | (2006.01) | |

(52) U.S. Cl.
CPC .............. *E01C 19/004* (2013.01); *B60T 7/12* (2013.01); *E01C 19/26* (2013.01)

(58) Field of Classification Search
CPC ........ E01C 19/004; E01C 19/26; E01C 19/23; E01C 19/288; E01C 19/48; B60T 7/12; B60T 2210/10; B60T 2210/32; B60T 7/22
USPC ........................................................ 701/2
See application file for complete search history.

(56) References Cited

U.S. PATENT DOCUMENTS

| | | | |
|---|---|---|---|
| 7,731,450 B2 | 6/2010 | Congdon et al. | |
| 8,364,366 B2 | 1/2013 | Foessel et al. | |
| 8,477,021 B2 | 7/2013 | Slack | |
| 9,367,042 B2 | 6/2016 | Oetken et al. | |
| 2021/0324587 A1* | 10/2021 | Marsolek | B60W 30/09 |
| 2021/0324588 A1 | 10/2021 | Pawlik | |
| 2023/0094845 A1* | 3/2023 | Marsolek | G05D 1/0022 701/2 |
| 2023/0160152 A1* | 5/2023 | Doy | B60K 35/00 701/50 |
| 2023/0205215 A1* | 6/2023 | Doy | G05D 1/0214 |
| 2023/0220645 A1* | 7/2023 | Doy | E01C 19/282 404/133.05 |
| 2023/0294602 A1* | 9/2023 | Doy | B60Q 1/28 404/75 |
| 2023/0323612 A1* | 10/2023 | Keyes | G05D 1/0214 |

(Continued)

FOREIGN PATENT DOCUMENTS

| | | | | |
|---|---|---|---|---|
| CN | 114655242 A | | 6/2022 | |
| DE | 102022115469 A1 * | | 12/2022 | E01C 19/004 |
| JP | 3927458 B2 | | 2/2004 | |

*Primary Examiner* — Muhammad Shafi

(57) ABSTRACT

A compactor machine may include a frame, a compaction member attached to the frame, and a controller attached to the frame. The controller may be configured to detect, while the compactor machine is traveling on a paving material mat to perform compacting, an event that is to cause the compactor machine to perform a stop. The controller may be configured to identify, based on detecting the event, a zone that the compactor machine is to use to perform the stop. The controller may be configured to cause the compactor machine to travel to the zone to perform the stop.

18 Claims, 3 Drawing Sheets

(56) References Cited

U.S. PATENT DOCUMENTS

2023/0343144 A1* 10/2023 Doy .................... G06F 3/04815
2023/0383480 A1* 11/2023 Doy ........................ E01C 19/26

* cited by examiner

CONTROLLED STOPPING FOR A COMPACTOR MACHINE

TECHNICAL FIELD

The present disclosure relates generally to compactor machines and, for example, to controlled stopping for a compactor machine.

BACKGROUND

Compaction of a surface material, such as soil or asphalt, can improve strength and stability of the surface. In a paving context, a paving machine distributes hot paving material, such as asphalt, over a surface, and a mobile compactor machine follows the paving machine to compact the material to a desired density and obtain an acceptable surface finish. Generally, a consistent density and smooth surface finish may be achieved by the compactor machine travelling over the hot paving material at a relatively constant speed.

However, sometimes during a compacting operation, the compactor machine may need to stop while on hot paving material. This may be particularly prevalent for a compactor machine operating autonomously, where the compactor machine may be configured to stop if an object is detected in a path of the compactor machine or if the compactor machine loses a positioning signal for navigation or loses communications with nearby machines. As a result of the compactor machine stopping while on hot paving material, a surface of the paving material may be deformed or damaged, thereby requiring reworking or repair of the surface that consumes machine hours, increases machine wear, and/or increases fuel consumption.

U.S. Pat. No. 8,477,021 (the '021 patent) discloses a worksite proximity warning system to avoid vehicle collisions. The '021 patent states that the proximity warning system is configured to provide both low level and high level alarms to an operator when an obstacle approaches or enters a safe zone, and when the machine approaches and enters a hazard zone. While avoiding obstacles is a reason that a compactor machine may stop on hot paving material, the '021 patent does not address how to avoid deformation or damage of a surface of a paving material mat due to the compactor machine stopping.

The controller of the present disclosure solves one or more of the problems set forth above and/or other problems in the art.

SUMMARY

A compactor machine may include a frame, a compaction member attached to the frame, and a controller attached to the frame. The controller may be configured to detect, while the compactor machine is traveling on a paving material mat to perform compacting, an event that is to cause the compactor machine to perform a stop. The controller may be configured to identify, based on detecting the event, a zone that the compactor machine is to use to perform the stop. The controller may be configured to cause the compactor machine to travel to the zone to perform the stop.

A method may include detecting, by a controller of a compactor machine, while the compactor machine is traveling on a paving material mat to perform compacting, an event that is to cause the compactor machine to perform a stop. The method may include determining, by the controller and based on at least one of temperature sensor data or density sensor data relating to the paving material mat, whether the compactor machine is to perform the stop at a location of the compactor machine at a time that the event is detected. The method may include performing, by the controller, one or more actions based on a determination that the compactor machine is not to perform the stop at the location of the compactor machine.

A controller for a compactor machine may include one or more memories and one or more processors coupled to the one or more memories. The one or more processors may be configured to detect, while the compactor machine is traveling on a paving material mat to perform compacting, an event that is to cause the compactor machine to perform a stop. The one or more processors may be configured to identify, based on detecting the event, a zone that the compactor machine is to use to perform the stop. The one or more processors may be configured to cause the compactor machine to travel to the zone to perform the stop.

DETAILED DESCRIPTION

Figure 1:
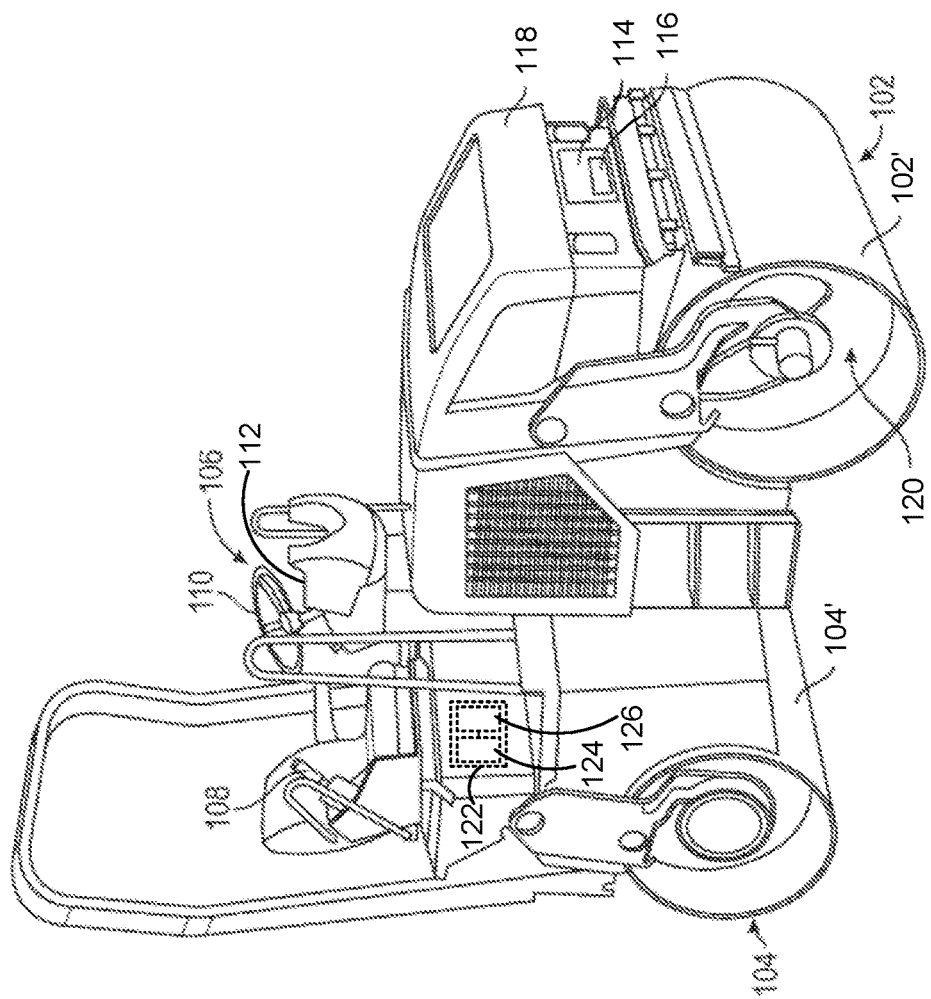
FIG. 1 is a perspective view of an example machine described herein.

FIG. 1 is a perspective view of an example machine 100 described herein. While in FIG. 1 the machine 100 is depicted as a compactor machine, the machine 100 may be another type of machine configured to perform compaction of a ground material. The machine 100 may be an asphalt compactor machine (e.g., a self-propelled, double-drum compactor machine), a vibratory drum compactor machine, or the like, which may be used to compact various materials, such as soil and/or asphalt, among other examples.

The machine 100 has at least one compaction member, such as a compaction drum. For example, as shown, the machine 100 has a front compaction drum 102 and a back compaction drum 104. The compaction drums 102, 104 are a set of ground-engaging members that provide ground engagement of the machine 100 at surfaces 102', 104' of the compaction drums 102, 104, respectively. The surfaces 102', 104' may include cylindrical surfaces that form exteriors of shells of the compaction drums 102, 104, respectively. As the machine 100 passes over a mat of paving material, the surfaces 102', 104' roll against the paving material and provide compaction forces to the paving material due to a weight of the machine 100. One or more of the compaction drums 102, 104 may include a vibratory component configured to cause the compaction drums 102, 104 to vibrate, thereby further facilitating compaction. In some examples, the machine 100 may include one or more other ground-engaging members, such as one or more wheels and/or one or more tracks, in addition or alternatively to the front compaction drum 102 or the back compaction drum 104.

The machine 100 includes an operator station 106 equipped with various systems and/or mechanisms for control of the operation of the machine 100. For example, the operator station 106 may include a drive system control 108 (shown as a shift lever) and/or a steering system control 110 (shown as a steering wheel). A steering system of the machine 100 may include the steering system control 110, a steering column (e.g., connected to the steering system control 110), a steering actuator (e.g., a steering cylinder for power steering), and/or a steering linkage assembly (e.g., that connects the steering system control 110 or the steering column to ground engagement members, such as the compaction drums 102, 104, via a plurality of linkage members, such as rods). The operator station 106 may also include a display 112 that provides a graphical user interface for operating the machine 100.

The machine 100 includes an engine 114 and a generator 116 coupled with the engine 114. The engine 114 and the generator 116 are attached to a frame 118 of the machine 100. The generator 116 may serve as an electrical power source for various onboard systems and components of the machine 100. The engine 114 may include any type of engine (e.g., an internal combustion engine, a gasoline engine, a diesel engine, a gaseous fuel engine, or the like). The engine 114 is configured to drive movement of the machine 100 (e.g., via compaction drums 102, 104) and other components of the machine 100, such as the generator 116. In some examples, the machine 100 may include an electric motor and an electrical power storage device (e.g., a battery), and/or a fuel cell power source, additionally or alternatively to the engine 114. The compaction members 102, 104 can be connected to the frame 118. The machine 100 also includes a braking system 120 configured to receive operator input to decrease or arrest a speed of the machine 100.

The machine 100 includes a controller 122 (e.g., an electronic control module (ECM)) supported by, or otherwise attached to, the frame 118. The controller 122 may include one or more memories 124 and one or more processors 126 communicatively coupled to the one or more memories 124. A processor 126 may include a central processing unit, a graphics processing unit, a microprocessor, a controller, a microcontroller, a digital signal processor, a field-programmable gate array, an application-specific integrated circuit, and/or another type of processing component. The processor 126 may be implemented in hardware, firmware, or a combination of hardware and software. The processor 126 may be capable of being programmed to perform one or more operations or processes described elsewhere herein. A memory 124 may include volatile and/or nonvolatile memory. For example, the memory 124 may include random access memory (RAM), read only memory (ROM), a hard disk drive, and/or another type of memory (e.g., a flash memory, a magnetic memory, and/or an optical memory). The memory 124 may be a non-transitory computer-readable medium. The memory 124 may store information, one or more instructions, and/or software (e.g., one or more software applications) related to the operation of the controller 122.

As indicated above, FIG. 1 is provided as an example. Other examples may differ from what is described in connection with FIG. 1.

Figure 2:
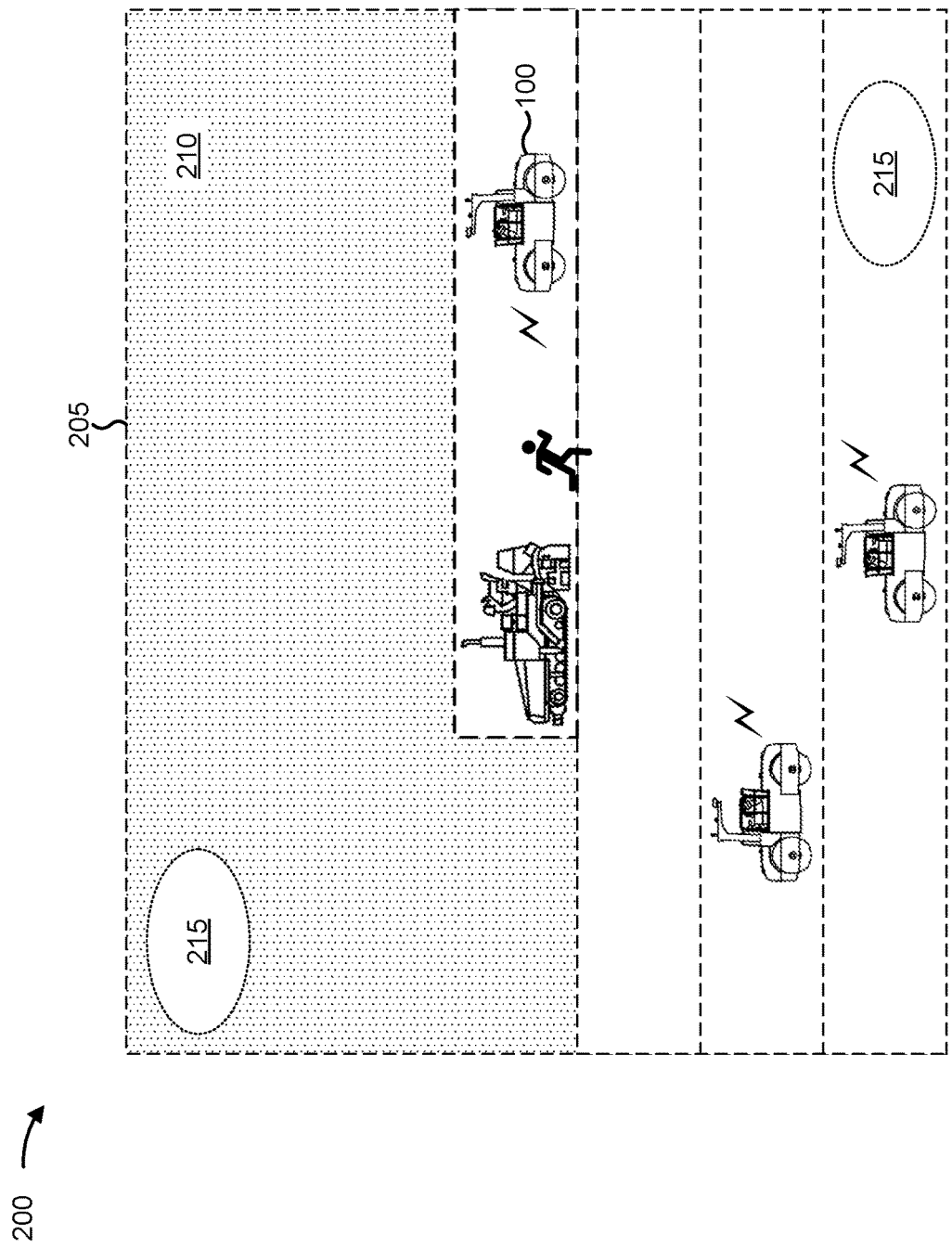
FIG. 2 is a diagram of an example associated with controlled stopping for a compactor machine.

FIG. 2 is a diagram of an example 200 associated with controlled stopping for a compactor machine described herein. As shown, a plurality of machines may perform work at a worksite 205 to condition a ground surface 210. The plurality of machines may include the machine 100 and one or more additional work machines, such as one or more paving machines and/or one or more compactor machines. For example, a paving machine may perform a paving operation to distribute a paving material mat (e.g., an asphalt mat) over the ground surface 210, and the machine 100 may follow the paving machine to compact the paving material. In some implementations, the plurality of machines may use machine-to-machine communication to exchange information with each other, such as location data and/or sensor data.

In some implementations, the machine 100 may operate at the worksite 205 in an autonomous driving mode, in which propulsion, steering, and braking is controlled autonomously by the machine 100. Alternatively, driving operations of the machine 100, such as propulsion, steering, and braking, may be controlled manually by an operator of the machine 100, who may be stationed on the machine 100 or at a remote console.

As the machine 100 travels on the paving material mat distributed by the paving machine, the controller 122 may generate one or more maps. A map may include a collection of data relating to locations of the worksite 205 (e.g., such data can be, but does not have to be, expressed in a visual format). The controller 122 may generate a time map indicating times and locations associated with travel of the machine 100 on the paving material mat. As an example, as the machine 100 travels on the paving material mat (e.g., to perform compacting), the controller 122 may periodically detect a location of the machine 100 (e.g., using a global navigation satellite system (GNSS)), and the controller 122 may record the location in association with a timestamp, thereby generating a time map indicating a chronological list of times and locations of the machine 100 on the paving material mat.

Additionally, or alternatively, the controller 122 may generate a heat map indicating temperatures of the paving material mat at various locations. The controller 122 may generate the heat map based on temperature sensor data relating to the paving material mat collected by the machine 100 and/or collected by one or more work machines that are at the worksite 205 with the machine 100 (e.g., the machine 100 may receive, via machine-to-machine communication, the temperature sensor data collected by the work machines). For example, as the machine 100 travels on the paving material mat (e.g., to perform compacting), the controller 122 may periodically detect a location of the machine 100 (e.g., using a GNSS) and a temperature of the paving material mat, and the controller 122 may record the location in association with the temperature, thereby generating a heat map indicating a list of temperatures and locations of the paving material mat. The heat map may also indicate respective times associated with the temperatures, which may indicate times that temperature sensor data was collected for each temperature of the heat map. In some implementations, the controller 122 may update temperatures of the heat map based on the times (e.g., amounts of elapsed time from the times) and a known cooling rate of the paving material (e.g., at a particular ambient temperature and/or ambient humidity).

Additionally, or alternatively, the controller 122 may generate a density map indicating densities of the paving material mat at various locations. The controller 122 may generate the density map based on density sensor data relating to the paving material mat collected by the machine 100 and/or collected by one or more work machines that are at the worksite 205 with the machine 100 (e.g., the machine 100 may receive, via machine-to-machine communication, the density sensor data collected by the work machines). For example, as the machine 100 (or another work machine) travels on the paving material mat (e.g., to perform compacting), the controller 122 may periodically detect a location of the machine 100 (e.g., using a GNSS) and a density of the paving material mat, and the controller 122 may record the location in association with the density, thereby generating a density map indicating a list of densities and locations of the paving material mat. The controller 122 may update the density map as new density sensor data is collected by the machine 100 (or another work machine) in connection with additional compaction passes. The density sensor data may be sensor data that directly indicates density measurements, or sensor data that indicates other types of measurements that can be used to estimate density.

In some implementations, one or more of the other work machines may also generate a time map, a heat map, and/or a density map. Accordingly, the controller 122 may receive one or more maps from another work machine.

While the machine 100 is traveling on the paving material mat, the controller 122 may detect an event that is to cause the machine 100 to perform a stop (e.g., to stop traveling). The event may be that the machine 100 has lost a communication connection (e.g., machine-to-machine communication) with one or more work machines that are at the worksite 205 with the machine 100. Additionally, or alternatively, the event may be that the machine 100 has lost a communication connection with a supervisory system (e.g., a back office device) for the machine 100 and/or a remote control device for the machine 100. For example, without the communication connection, the machine 100 may not receive location data from the work machines or may not receive instructions or commands from the supervisory system or the remote control device, and the machine 100 should stop to avoid a collision. The controller 122 may detect that the machine 100 has lost the communication connection with the one or more work machines, the supervisory system, and/or the remote control device based on detecting an absence of received communications (e.g., when such communications are scheduled or configured to be received) over a threshold time period and/or based on detecting an absence of acknowledgements being received, for communications transmitted by the machine 100, over a threshold time period.

The event may be that the machine 100 has lost a positioning signal used for navigation (e.g., one or more satellite navigation signals). For example, without the positioning signal, the machine 100 may be unable to detect a location of the machine 100, and the machine 100 should stop to avoid a collision. The controller 122 may detect that the machine 100 has lost the positioning signal based on detecting an absence of the positioning signal (e.g., due to signal blockage, due to receiver malfunction, or due to a loss of time synchronization) over a threshold time period.

The event may be detection of an obstruction (e.g., an object or a person in a path of the machine 100) within a particular distance (e.g., 20 feet, 15 feet, or the like) of the machine 100. For example, based on the obstruction being within the particular distance of the machine 100, the machine 100 should stop to avoid a collision. The controller 122 may detect the obstruction using an autonomous driving system of the machine 100, which may include one or more cameras, one or more lidar systems, or the like. For example, the controller 122 may detect the obstruction based on processing camera data and/or lidar data using computer vision techniques or other machine learning techniques.

The event may be the paving machine (that the machine 100 is following) stopping. For example, when the paving machine stops, the machine 100 also should stop to avoid a collision with the paving machine. The controller 122 may detect the paving machine stopping using machine-to-machine communication with the paving machine (e.g., the machine 100 may receive an indication from the paving machine, such as location data associated with the paving machine, indicating that the paving machine is stopped). Additionally, or alternatively, the controller 122 may detect the paving machine stopping using an autonomous driving system of the machine 100, in a similar manner as described above.

The event may be a machine fault of the machine 100, such as an electrical system failure or an electrical component failure, a mechanical system failure or a mechanical component failure, or a hydraulic system failure or a hydraulic component failure. For example, the controller 122 may detect a machine fault based on losing communication with a system or a component and/or based on receiving a fault notification from a system or a component, among other examples. Based on detecting the machine fault, the machine 100 should stop to permit repair of the machine 100. The event may be a battery level or a fluid level (e.g., a fuel level, a diesel exhaust fluid level, a water level, or the like) dropping below a threshold. For example, the controller 122 may monitor the battery level or the fluid level to detect when the battery level or the fluid level drops below the threshold. Accordingly, the machine 100 should stop to permit recharging of the battery or refilling of the fluid.

Based on detecting the event that is to cause the machine 100 to perform the stop, the controller 122 may determine whether the machine 100 may perform the stop at a location of machine 100 at the time the event is detected (e.g., a current location of the machine 100). For example, the controller 122 may determine whether the machine 100 may perform the stop at the location based on temperature sensor data and/or density sensor data relating to the paving material mat (e.g., at the location). For example, if the temperature sensor data indicates a temperature of the paving material mat at the location that exceeds a threshold (e.g., the temperature is too high), and/or if the density sensor data indicates a density of the paving material mat at the location that is below a threshold (e.g., the density is too low), then the controller 122 may determine that the machine 100 is not to perform the stop at the location.

The controller 122 may perform one or more actions based on a determination that the machine 100 is not to perform the stop at the location. For example, the controller 122 may cause an indicator (e.g., an indicator light, an indicator on display 112, or the like) to indicate that the machine 100 is not to perform the stop at the location of the machine 100 (e.g., the indicator may turn red, may start blinking, or the like). When the machine 100 is manually operated, this may prompt an operator to drive the machine 100 elsewhere. While the machine 100 is in transit, the controller 122 may continue to determine whether the machine 100 may perform the stop at a current location (e.g., based on temperature sensor data and/or density sensor data, as described above), and the controller 122 may activate the indicator accordingly. For example, based on a determination that the machine 100 may perform the stop at a current location of the machine 100, the controller 122 may cause the indicator to indicate that the machine 100 can perform the stop at the current location (e.g., the indicator may turn green, may stop blinking, or the like).

Additionally, or alternatively, based on detecting the event and/or based on a determination that the machine 100 is not to perform the stop at the location, the controller 122 may identify a zone 215 (e.g., one or more zones 215) that the machine 100 is to use to perform the stop (which can be referred to as a "holding zone," a "stopping zone," a "parking zone," or the like). The zone 215 may be an area of the worksite 205 (e.g., that is smaller than a total area of the worksite 205). In some examples, the zone 215 may be a location of the worksite 205, designated for stopping, that is configured for the machine 100. For example, an operator of the machine 100 or a supervisor of the worksite 205 may designate the location for stopping (e.g., by providing an input to the machine 100 or to a back office device that may control the machine 100). In some examples, to identify the zone 215, the controller 122 may determine the zone 215 based on temperature sensor data and/or density sensor data (e.g., collected by the machine 100 and/or by one or more other work machines) relating to the paving material mat. For example, based on a determination that the machine 100 is not to perform the stop at the location, the machine 100 may begin to travel elsewhere (whether by manual control or by autonomous control via the controller 122), and as the machine is traveling, the controller 122 may determine whether the machine 100 may perform the stop at a current location of the machine 100 (e.g., based on temperature sensor data and/or density sensor data, as described above). Accordingly, the machine 100 may determine the zone 215 to encompass a location where the controller 122 has determined that the machine 100 may perform the stop.

In some examples, to identify the zone 215, the controller 122 may determine the zone 215 based on the time map generated by the controller 122. For example, the controller 122 may identify a location of the time map associated with a time from which a threshold amount of time has elapsed (e.g., 1 hour, 2 hours, or the like), and the controller 122 may use the location as the zone 215 (e.g., because the location has likely cooled enough to allow for stopping of the machine 100). Additionally, or alternatively, to identify the zone 215, the controller 122 may determine the zone 215 based on the heat map generated by the controller 122. For example, the controller 122 may identify a location of the heat map associated with a temperature that is below a threshold, and the controller 122 may use the location as the zone 215. Additionally, or alternatively, to identify the zone 215, the controller 122 may determine the zone 215 based on the density map generated by the controller 122. For example, the controller 122 may identify a location of the density map associated with a density that exceeds a threshold, and the controller 122 may use the location as the zone 215.

The controller 122 may cause the machine 100 to travel to the zone 215, identified by the controller 122, to perform the stop (e.g., causing the machine 100 to travel to the zone 215 may be an action performed by the controller 122, as described above). The controller 122 may cause the machine 100 to travel to the zone 215 by generating a control signal for an autonomous driving system of the machine 100. For example, the control signal may identify geographic coordinates (e.g., latitude and longitude coordinates) associated with the zone 215. In some examples, the controller 122 may detect, based on location data associated with the machine 100, that the machine 100 is in the zone 215, and the controller 122 may cause the machine 100 to perform the stop in the zone 215 (e.g., by generating a control signal for the braking system 120).

After the machine 100 is stopped in the zone 215, the controller 122 may detect an additional event indicating that the machine 100 can leave the zone 215. For example, the additional event may include the machine 100 regaining a communication connection with one or more work machines that are at the worksite 205 with the machine 100 (e.g., if the event was the machine 100 losing the communication connection), the machine 100 regaining a positioning signal for navigation (e.g., if the event was the machine 100 losing the positioning signal), detection of clearing of an obstruction and/or receiving an indication of clearing of the obstruction (e.g., if the event was detection of the obstruction), and/or the paving machine (that the compactor machine is following) resuming movement (e.g., if the event was the paving machine stopping). Based on detecting the additional event, the controller 122 may cause the machine 100 to return to the paving material mat (e.g., to a last-worked location on the paving material mat). If the controller 122 detects a subsequent event that is to cause the machine 100 to perform a stop, then the controller 122 may cause the machine 100 to return to the zone 215 (or a different zone 215), in a similar manner as described above, and so forth.

As indicated above, FIG. 2 is provided as an example. Other examples may differ from what is described in connection with FIG. 2.

Figure 3:
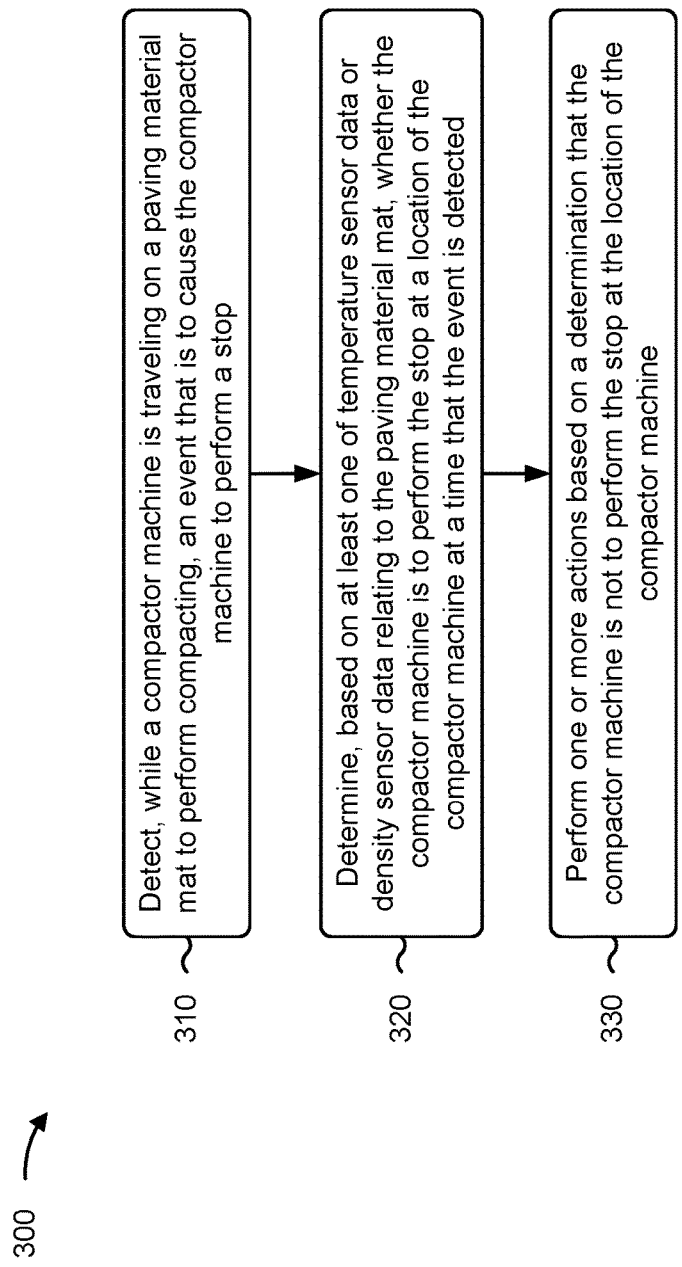
FIG. 3 is a flowchart of an example process associated with controlled stopping for a compactor machine.

FIG. 3 is a flowchart of an example process 300 associated with controlled stopping for a compactor machine. One or more process blocks of FIG. 3 may be performed by a controller (e.g., controller 122). Additionally, or alternatively, one or more process blocks of FIG. 3 may be performed by another device or a group of devices separate from or including the controller, such as another device or component that is internal or external to machine 100.

As shown in FIG. 3, process 300 may include detecting, while a compactor machine is traveling on a paving material mat to perform compacting, an event that is to cause the compactor machine to perform a stop (block 310). For example, the controller may detect the event, as described above. The compactor machine may be operating in an autonomous driving mode. The event may be that the compactor machine has lost a communication connection with one or more work machines that are at a worksite with the compactor machine, with a supervisory system for the compactor machine, or with a remote control device for the compactor machine. The event may be that the compactor machine has lost a positioning signal used for navigation. The event may be the detection of an obstruction within a particular distance of the compactor machine. The event may be a paving machine, that the compactor machine is following, stopping. The event may be a machine fault of the compactor machine. The event may be a battery level or a fluid level of the compactor machine dropping below a threshold.

As further shown in FIG. 3, process 300 may include determining, based on at least one of temperature sensor data or density sensor data relating to the paving material mat, whether the compactor machine is to perform the stop at a location of the compactor machine at a time that the event is detected (block 320). For example, the controller may determine whether the compactor machine is to perform the stop, as described above.

As further shown in FIG. 3, process 300 may include performing one or more actions based on a determination that the compactor machine is not to perform the stop at the location of the compactor machine (block 330). For example, the controller may perform one or more actions, as described above. In some examples, performing the one or more actions may include causing an indicator to indicate that the compactor machine is not to perform the stop at the location of the compactor machine.

Process 300 may include identifying, based on detecting the event, a zone that the compactor machine is to use to perform the stop. In some examples, performing the one or more actions may include causing the compactor machine to travel to the zone to perform the stop. Causing the compactor machine to travel to the zone may include generating a control signal for an autonomous driving system of the compactor machine, where the control signal identifies geographic coordinates associated with the zone. The zone may be a location, designated for stopping, that is configured for the compactor machine. Alternatively, identifying the zone may include generating a map indicating times and locations associated with travel of the compactor machine on the paving material mat, and determining the zone based on the map. Additionally, or alternatively, identifying the zone may include determining the zone based on at least one of temperature sensor data or density sensor data relating to the paving material mat. For example, identifying the zone may include generating at least one of a heat map or a density map of the paving material mat based on sensor data collected by at least one of the compactor machine or one or more work machines that are at a worksite with the compactor machine, and determining the zone based on the at least one of the heat map or the density map. Process 300 may include detecting, based on location data associated with the compactor machine, that the compactor machine is in the zone, and causing the compactor machine to perform the stop in the zone.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The controller described herein may be used with any mobile machine configured to perform compaction of a material, such as a paving material (e.g., asphalt). For example, the controller may be used with a compactor machine equipped with one or more compaction drums that are configured to roll against a paving material and provide compaction forces to the paving material. In some examples, the controller may be used with a compactor machine that performs compacting operations autonomously.

Sometimes during a compacting operation, a compactor machine may need to stop while on hot paving material. For example, a compactor machine operating autonomously may be configured to stop if an object is detected in a path of the compactor machine or if the compactor machine loses a positioning signal for navigation or loses communications with nearby machines. As a result, a surface of the paving material may be deformed or damaged, thereby requiring reworking or repair of the surface that consumes machine hours, increases machine wear, and/or increases fuel consumption.

The controller described herein is useful for reducing deformation or damage to paving material that is being worked by a compactor machine. In particular, the controller may detect an event that is to cause the compactor machine to perform a stop, but rather than immediately stopping when the event is detected, the controller may cause the compactor machine to travel to a particular stopping zone to perform the stop. The stopping zone may be a location associated with paving material that has cooled enough and/or that is dense enough for the compactor machine to stop on without causing deformation or damage to the paving material. Additionally, or alternatively, the stopping zone may be a location of a worksite that is other than a surface being paved. In this way, the controller may reduce deformation or damage of a surface being paved, thereby reducing or preventing the need to rework or repair the surface. Accordingly, the controller may conserve machine hours, reduce machine wear, and/or conserve fuel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and "a set" are intended to include one or more items, and may be used interchangeably with "one or more." The term "attached" is used in the broadest sense to encompass any connection between two structures, whether direct or indirect (that is, through the use of one or more intervening elements or bonding materials). Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A compactor machine, comprising:
   a frame;
   a compaction member attached to the frame; and
   a controller, attached to the frame, configured to:
   generate at least one of a heat map or a density map of the paving material mat based on sensor data collected by at least one of the compactor machine or one or more work machines that are at a worksite with the compactor machine;
   detect, while the compactor machine is traveling on a paving material mat to perform compacting, an event that is to cause the compactor machine to perform a stop;
   identify, based on detecting the event, a zone that the compactor machine is to use to perform the stop, wherein the zone is determined based on the at least one of the heat map or the density map; and
   cause the compactor machine to travel to the zone to perform the stop.

2. The compactor machine of claim 1, wherein the compaction member comprises a front compaction drum and a back compaction drum.

3. The compactor machine of claim 1, wherein the event is the compactor machine has lost a communication connection with one or more work machines that are at a worksite with the compactor machine, with a supervisory system for the compactor machine, or with a remote control device for the compactor machine.

4. The compactor machine of claim 1, wherein the event is the compactor machine has lost a positioning signal used for navigation.

5. The compactor machine of claim 1, wherein the event is detection of an obstruction within a particular distance of the compactor machine.

6. The compactor machine of claim 1, wherein the event is a paving machine, that the compactor machine is following, stopping.

7. The compactor machine of claim 1, wherein the zone is a location, designated for stopping, that is configured for the compactor machine.

8. The compactor machine of claim 1, wherein the controller, to identify the zone, is configured to:
generate a map indicating times and locations associated with travel of the compactor machine on the paving material mat; and
determine the zone based on the map.

9. The compactor machine of claim 1, wherein the controller, to cause the compactor machine to travel to the zone, is configured to:
generate a control signal for an autonomous driving system of the compactor machine, the control signal identifying geographic coordinates associated with the zone.

10. A method, comprising:
generating, by a controller of a compactor machine, at least one of a heat map or a density map of a paving material mat based on sensor data collected by at least one of the compactor machine or one or more work machines that are at a worksite with the compactor machine;
determining a zone based on the at least one of the heat map or the density map;
detecting, by the controller of the compactor machine, while the compactor machine is traveling on the paving material mat to perform compacting, an event that is to cause the compactor machine to perform a stop;
determining, by the controller and based on at least one of the heat map or the density map relating to the paving material mat, whether the compactor machine is to perform the stop at a location of the compactor machine at a time that the event is detected; and
performing, by the controller, one or more actions based on a determination that the compactor machine is not to perform the stop at the location of the compactor machine.

11. The method of claim 10, further comprising:
identifying, by the controller and based on detecting the event, the zone that the compactor machine is to use to perform the stop.

12. The method of claim 11, wherein performing the one or more actions comprises:
causing, by the controller, the compactor machine to travel to the zone to perform the stop.

13. The method of claim 10, wherein performing the one or more actions comprises:
causing, by the controller, an indicator to indicate that the compactor machine is not to perform the stop at the location of the compactor machine.

14. The method of claim 10, wherein the compactor machine is operating in an autonomous driving mode.

15. A controller for a compactor machine, comprising:
one or more memories; and
one or more processors, coupled to the one or more memories, configured to:
detect, while the compactor machine is traveling on a paving material mat to perform compacting, an event that is to cause the compactor machine to perform a stop, wherein the event is at least one of:
the compactor machine has lost a communication connection with one or more work machines that are at a worksite with the compactor machine, with a supervisory system for the compactor machine, or with a remote control device for the compactor machine;
identify, based on detecting the event, a zone that the compactor machine is to use to perform the stop; and
cause the compactor machine to travel to the zone to perform the stop.

16. The controller of claim 15, wherein the one or more processors, to identify the zone, are configured to:
determine the zone based on at least one of temperature sensor data or density sensor data relating to the paving material mat.

17. The controller of claim 15, wherein the one or more processors, to identify the zone, are configured to:
generate at least one of a heat map or a density map of the paving material mat based on sensor data collected by at least one of the compactor machine or one or more work machines that are at a worksite with the compactor machine; and
determine the zone based on the at least one of the heat map or the density map.

18. The controller of claim 15, wherein the one or more processors are further configured to:
detect, based on location data associated with the compactor machine, that the compactor machine is in the zone; and
cause the compactor machine to perform the stop in the zone.

* * * * *